June 19, 1923.
A. K. BRAUER
1,459,012
LAWN AND GARDEN SPRINKLING APPARATUS
Filed June 4, 1919
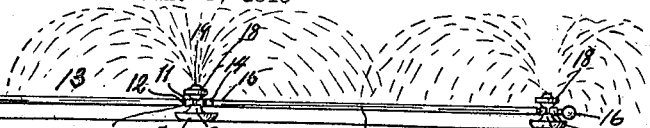
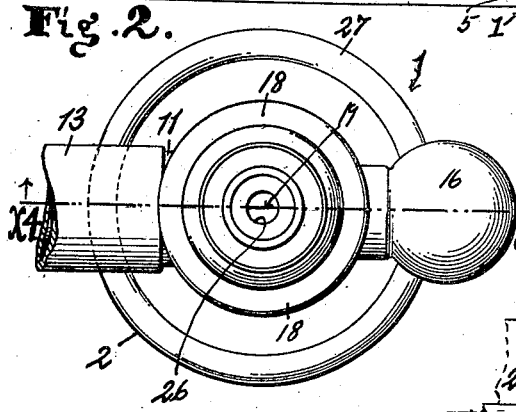
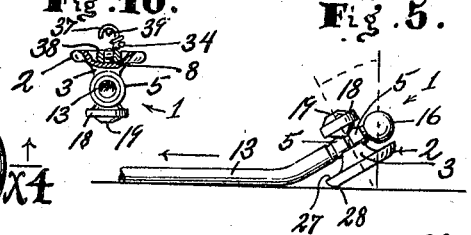
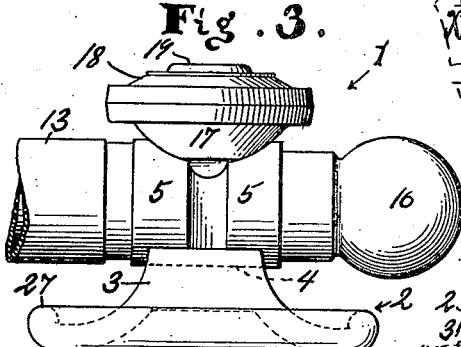
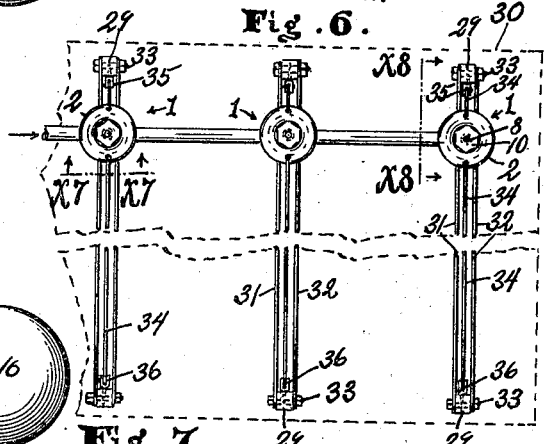
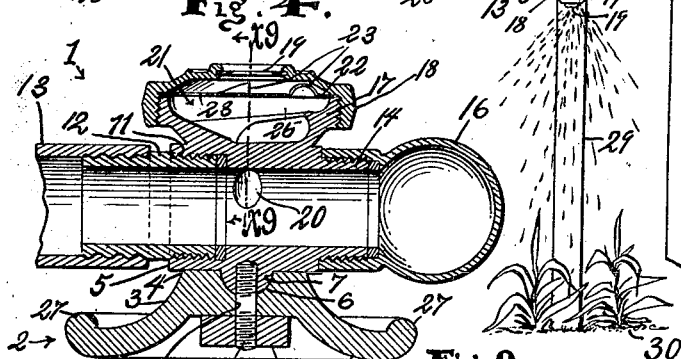
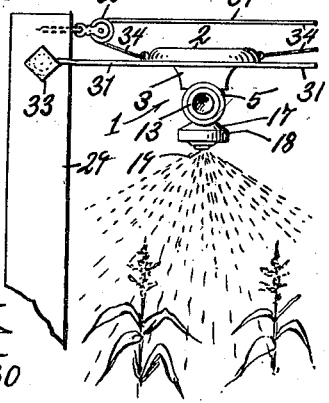
Witness:
W. M. Gentle
Inventor.
Adolph K. Brauer.
by James R. Townsend
his Atty.

Patented June 19, 1923.

1,459,012

UNITED STATES PATENT OFFICE.

ADOLPH K. BRAUER, OF LOS ANGELES, CALIFORNIA, SERENA DORATHEA BRAUER, EXECUTRIX OF SAID ADOLPH K. BRAUER, DECEASED, ASSIGNOR TO SERENA DORATHEA BRAUER, OF LOS ANGELES, CALIFORNIA.

LAWN AND GARDEN SPRINKLING APPARATUS.

Application filed June 4, 1919. Serial No. 301,803.

*To all whom it may concern:*

Be it known that I, ADOLPH K. BRAUER, a citizen of the United States, residing at Los Angeles, in the county of Los Angeles and State of California, have invented a new and useful Lawn and Garden Sprinkling Apparatus, of which the following is a specification.

This invention relates to apparatus for irrigating lawns and gardens by the applications of water in a misty spray; and it may be said to consist in the provision of the new and novel features, and in the construction, combination and arrangements of parts, the purposes of which will be apparent to those skilled in the art from a consideration of the preferred form of apparatus herein shown.

The principal object of this invention is to provide a spraying apparatus that can be moved from place to place over the lawn or garden without diverting the spray nozzle from a vertical position.

Another object of the invention is to provide an apparatus that can be moved over the lawn or garden without the attendant entering the area that has been sprayed.

In other words the apparatus is provided with means by which it is moved after it has been in use on the lawn or garden a sufficient time to thoroughly saturate the ground to a considerable depth; at which time, as is well known, the ground is soft and the lawn and garden easily injured by attendant walking thereon to change the position of the spraying apparatus; and with this apparatus the danger of injuring the lawn or garden is eliminated as the attendant never enters the sprayed area.

Another object of the invention is to provide an apparatus that will produce a spray resembling a misty rain as nearly as possible; for experience has shown that the best irrigating results are obtained in the application of water in the misty form; for in this way the water enters the ground without packing it, which packing invariably results when water is discharged toward the ground with considerable force and volume.

Another object of this invention is to provide a means for positioning the spray nozzles of the apparatus a considerable distance above the ground so that the misty spray can descend on the top of tall vegetation like a gentle rain.

Other objects, advantages and features of invention may appear from the accompanying drawings, the subjoined detailed description and the appended claims.

The drawings illustrate the invention.

Figure 1 is a side elevation of a line of hose equipped with the apparatus; and is shown in operation on a lawn.

Fig. 2 is a plan view of one of the sprinkling units enlarged to about three-fourths of the size usually used in lawn and garden irrigating.

Fig. 3 is a side elevation of the device shown in Fig. 2 and on the same scale.

Fig. 4 is a section on line $x^4$ of Fig. 2, showing a detailed construction of the apparatus.

Fig. 5 is a diagrammatic view of the device showing an imaginary position of the apparatus as it is being moved from place to place. The direction of movement being indicated by an arrow.

Fig. 6 is a plan view of a garden with a sprinkling apparatus attached to an overhead support, the outline of the garden being indicated by a dotted line.

Fig. 7 is a section on line $x^7$ of Fig. 6 with parts somewhat enlarged.

Fig. 8 is a section on line $x^8$ of Fig. 6, showing the means for moving the apparatus on the overhead support.

Fig. 9 is a section on line $x^9$ of Fig. 4, but showing a modified form of the spray nozzle.

Fig. 10 is an elevation of one of the sprinkling units with a part of the disk broken to show the means for attaching the device to the overhead support when a single wire is used.

In detail the apparatus 1 consists of a disk 2 that has in the center thereof the upward extension 3 and this extension has therein the concave recess or groove 4 in which recess is fitted a portion of the periphery of a barrel 5 in the form of a cylinder. Also in the upward extension 3 and central therein is a recess 6 that fits the curvature of a boss 7 that is integral with and on the underside of said barrel 5.

A stud bolt 8 is threaded into this boss 7 and extends downward through a hole 9 in the bottom of the disk 2 and has secured to the other end thereof the nut 10, by which bolt and nut the barrel 5 is secured to the base or disk 2. The underside of the disk 2 is recessed to form a clearance for the nut 10, so that when the apparatus is moved the nut will not contact with the lawn or ground.

One end of the barrel 5 is provided with the threaded socket 11 into which the screw end 12 of a hose 13 is adapted to fit; and the other end of the cylinder 5 has the threaded extension 14 that is adapted to fit the socket end 15 of a hose 13.

In other words, with this spraying apparatus which is provided with a socket and threaded extension, a plurality of spray nozzles 1 may be attached in a hose line 13 as shown in Fig. 1; by simply dividing the hose into a number of parts and providing each part with a screw and socket end that will attach to the socket 11 and extension 14.

The end spray nozzle has the threaded extension 14 closed by a spherical cap 16 which hollow sphere is filled with water and serves as a counter-balance when the device is in operation and the weight and pressure of the water assist in holding the spray nozzle 1 from tilting from a vertical to an inclined position. In other words assuming that the apparatus has been moved by pulling on the hose; and the end spray nozzle has been tilted to the inclined position shown in Fig. 5, the heavy base and counter balance will cause the nozzle to assume a vertical position when the water is turned on.

In other words the weight and pressure of the water in the hollow globe 16 will move the spray nozzle 1 from the inclined to a vertical position. On the upper side of the barrel 5 there is a large hollow extension or concave top 17 over which there is secured the cap 18 and the cap 18 is upwardly inclined and has in the top thereof the discharge opening 19.

As seen in Figs. 4 and 9 the water enters the spray nozzle 1 through the hose 13 and passes upward through a passageway or port 20 in the barrel 5 and this port enters an open spiral channel 25 that imparts to the water entering the compartment 21 a centrifugal motion round the interior surface of the extension 17 and cap 18; and this centrifugal movement causes the water to climb the inner walls of the extension 17 and cap 18 and discharge in a misty spray from the reduced opening 19.

In order to break up the water into an exceedingly fine spray there is positioned between the extension 17 and cap 18 a baffle plate 22, which plate has therein the inclined openings 23.

In a modified form of nozzle shown in Fig. 9 the baffle plate 22 is not used, but instead the cap 18 has its inner surface provided with an upwardly extended spiral channel 24 that is reduced in size from the spiral channel 25 in Fig. 4, so that the water passing upward in the chamber 21 is broken up by the spiral channel as it reaches the discharge opening 19.

The discharge opening 19 is central in the top end of the cap 18 and this opening is also inclined upward from the bottom to the top surface of the cap and terminates in a knife edge 26 the purpose of which is to assist in breaking the water discharging therefrom into a very fine mist.

The disk 2 of the apparatus 1 is formed with an enlarged ring surface 27; the purpose of which is to form a heavy weighted base that will prevent the nozzle from upsetting when it is being moved over the lawn or when it is subjected to the action of water passing through the hose.

As is well known, after a hose is unrolled from a reel and placed on the lawn and water under pressure is turned into it the hose will roll over on the lawn, which rolling of the hose, when there is a plurality of spray nozzles therein will cause one or more of said spray nozzles to upset and consequently divert the spray from its intended course; and with this weight attached to the base 2, the twisting effect of the hose is overcome.

Also the base 2 has an upturned edge and is provided with a supporting surface 28 that in cross section has the contour of a sled runner, and this curved surface enables the spray nozzles to be pulled over the surface of the ground by means of the hose without the nozzles upsetting.

When the apparatus is to be used for overhead spraying the base 2 performs another function for as seen in Figs. 6 to 8 inclusive the apparatus is elevated to a position above the garden and by means of the disks 2 is movably mounted so that the spray nozzles are inverted.

As seen in Fig. 6 there is a plurality of posts 29 that are oppositely disposed on the sides of the garden 30 and at the top of the post and on each side thereof are secured the wires 31 and 32, by means of the bolts 33, and these wires are drawn taut so that they maintain a relatively fixed plan.

These wires are spaced apart a sufficient distance so that when the disk 2 is inserted between them as shown in the drawing the spray apparatus and the hose attached thereto will be suspended above the garden in position to spray the vegetation below; the spray nozzles are positioned so that the misty spray escapes downward.

On opposite sides of the disk 2 there is secured by any well known means one end of the cable 34 that passes over the pulleys 35 and 36 and these pulleys are secured to the post 29 by any well known means.

When the cable 34 is moved in either direction it will cause the disk 2 to slide along the upper surface of the wires 31 and 32 and thereby move the spray nozzle and the hose from one position to another over the garden.

After the line of spray nozzles has been moved across the garden from one side to the other, the hose and spray nozzles can be easily removed by turning the disks slightly to one side and lifting them from the wires from whence the hose can be moved to the lawn for other spray purposes.

As seen in Fig. 10 each of the spray units can be provided with a hook 37 so that a single strand of wire can be used in connecting the posts 29; that is the nut 10 can be removed from the stud bolt 8 and replaced by a nut 38 having thereon the hook 37 by which the device can be attached to the overhead wire 39. Also the cable 34 can be attached to the hook 37 so that the line of springling units can be moved over the garden.

When the apparatus is to be used for irrigating orchards in which a large quantity of water is sprayed over a large area, the sprinkling units will be enlarged proportionately to the diameter of the irrigating pipe, that is the diameter of the socket 11 and threaded extension 14 will be enlarged to fit a pipe line of two and one-half or three inches in diameter; and of course it is obvious that the other parts of the apparatus will be proportionately enlarged.

I claim.

1. In a spraying apparatus, a weighted disk, an upward extension on said disk, a concave recess in said extension, a barrel having a portion of its periphery fitting into said concave recess and a stud bolt securing said barrel to said extension, an upward extension on said barrel, a chamber in the upward extension of said barrel, there being a passageway from said barrel to said chamber, there being a spiral channel in said chamber, a cap enclosing the top of said chamber, and a spray nozzle in said cap, said barrel being open at both ends to receive hose connections for the purpose as set forth.

2. In a spraying apparatus, a weighted disk having an upward extension and a concave recess in said extension; a barrel having a portion of its periphery fitting into said concave recess and a stud bolt securing said barrel and extension together; said barrel having an upward extension; a chamber in the extension of said barrel; there being a passageway from said barrel to said chamber, a cap enclosing the top of said chamber, a spray nozzle in said cap; and a counter-balance detachably connected to said spraying apparatus.

3. In a spraying apparatus the combination of a weighted disk having an upward extension provided with a concave groove; a barrel secured to said disk and having a portion of its periphery in said groove; a spray nozzle secured to said barrel; and there being a passageway between said barrel and said spray nozzle.

4. In a spraying apparatus the combination of a disk; a barrel secured to said disk; an extension on said barrel having a cap attached thereto and forming a chamber therein; the inner surfaces of said extension and said cap being provided with spiral channels; there being a passageway between said barrel and said chamber; and a nozzle attached to said cap; said cap having a discharge opening at its top which terminates in a knife edge.

5. In a spraying apparatus the combination of a weighted disk; a barrel secured to said disk and an extension on said barrel; a chamber in said extension the inner surface of which is provided with a spiral channel; a nozzle attached to said extension; a spiral channel in the inner wall of said chamber, and there being a passageway from said barrel into said chamber.

6. In a spraying apparatus, a weighted disk having an extension thereon provided with a concave groove; a barrel secured to said extension and having a portion of its periphery in said concave groove; an extension on said barrel; a chamber in the extension of said barrel; a spiral channel in the inner wall of said chamber, there being a port connecting the interior of said barrel with said spiral channel; and a conical cap provided with an outlet closing the top of said chamber except at the outlet thereof.

7. In a spraying apparatus, a disk having an upward extension thereon; said extension having a concave groove on its upper face and extending longitudinally thereof; a barrel having a portion of its periphery fitting into said concave groove; a stud bolt securing said barrel to said disk; a spray nozzle secured to said barrel and having a chamber therein; there being a port connecting said chamber and said spray nozzle; and said barrel being open at both ends to receive hose connections for the purpose as set forth.

8. In a spraying apparatus, a disk having an upward extension thereon; said extension having a concave groove on its upper face and extending longitudinally thereof; a barrel having a portion of its periphery fitting into said concave groove; a stud bolt securing said barrel to said disk, and a spray nozzle secured to said barrel and having a chamber therein the inner walls of which have a spiral channel; there being a port connecting said chamber and said spray nozzle.

9. In a sprinkling nozzle a disk; a barrel secured to said disk and an extension on said barrel the inner surface of which is provided with a spiral channel; and a cap secured over said extension to form a chamber and provided on its inner surface with a spiral channel and also provided with a discharge opening in its top.

10. In a sprinkling nozzle a disk; a barrel secured to said disk and an extension on said barrel the inner surface of which is provided with a spiral channel; and a cap secured over said extension to form a chamber and provided on its inner surface with a spiral channel that is reduced in size from the spiral channel of said extension and also provided with a discharge opening in its top.

In testimony whereof, I have hereunto set my hand at Los Angeles, California, this 28th day of May, 1919.

ADOLPH K. BRAUER.

Witness:
W. M. GENTLE.